Aug. 24, 1965

R. HOWARD 3,202,319

PRESSURE INDICATING DISPENSER CONTAINER

Filed Nov. 21, 1963

INVENTOR.
Roy Howard
BY
Scofield, Kokjer, Scofield & Lowe
ATTORNEYS.

Aug. 24, 1965      R. HOWARD      3,202,319
PRESSURE INDICATING DISPENSER CONTAINER
Filed Nov. 21, 1963      2 Sheets-Sheet 2
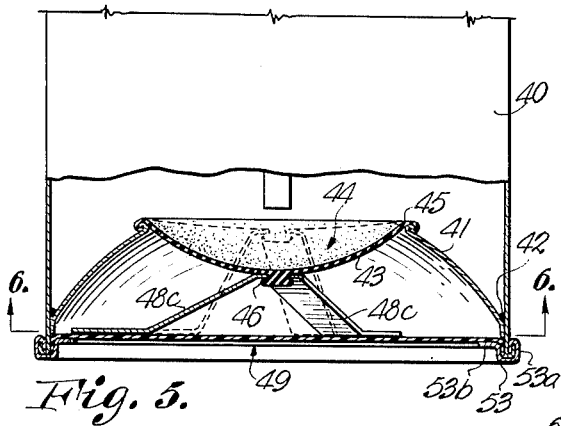
Fig. 5.
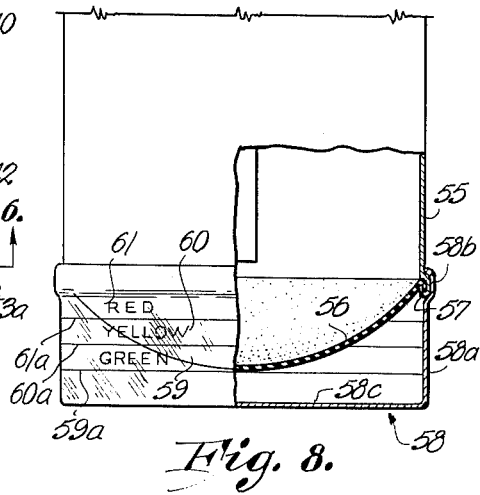
Fig. 8.
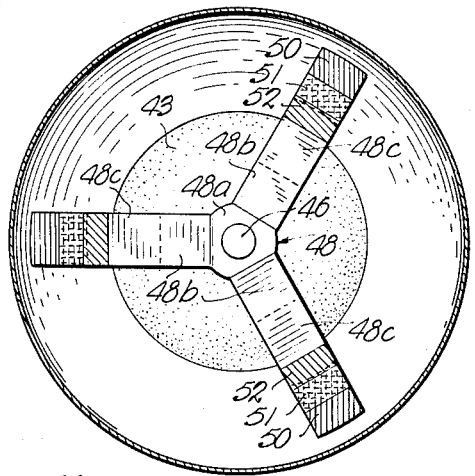
Fig. 6.
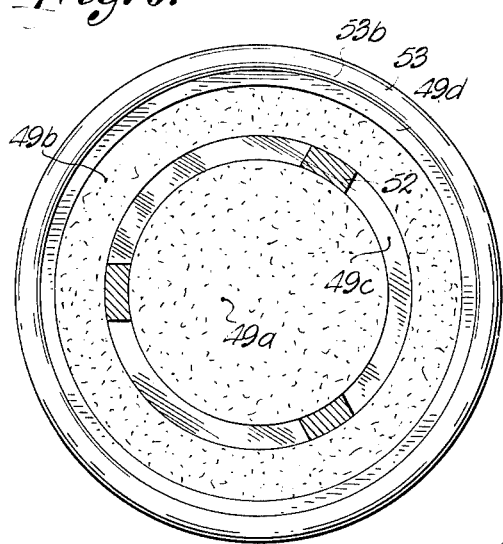
Fig. 7.
Fig. 9.
INVENTOR.
Roy Howard
BY
Scofield, Kokjer, Scofield & Lowe
ATTORNEYS.

United States Patent Office 3,202,319
Patented Aug. 24, 1965

3,202,319
PRESSURE INDICATING DISPENSER
CONTAINER
Roy Howard, 1135 Jefferson Ave., Buffalo, N.Y.
Filed Nov. 21, 1963, Ser. No. 325,292
9 Claims. (Cl. 222—41)

This invention relates to pressurized dispensing cans and refers more particularly to indicator means and devices for use with such pressurized dispenser cans, which indicator means are adapted to provide a continuously visible indication of the relative level of pressure in the can.

Very many different kinds of products, materials and substances are merchandised today in what are commonly known as aerosol containers or pressurized dispenser cans. These products include, typically, but without limitation, dispenser cans for consumer goods such as shaving cream, deodorants, hair sprays, food products, insecticides, room deodorizers, and the like, and dispenser cans for products used in construction and manufacture, as paint, sealing compound, etc. Such products may be dispensed from the containers under pressure either as liquids, atomized liquid sprays, gases or fluidized solids of various types. The common elements to all of these product dispensers are the container itself, typically a cylindrical can, the sealed nature of the container, the pressurization of the contents and the provision of dispenser means, usually including a drain or dispensing tube drawing from the lower levels of the container and discharging through a valve mounted on the top of the container.

The liquid nature of some of these products occasionally lends itself to an estimate, however rough, of the relative quantity of the product remaining in the can. Thus, by estimating the loss of weight of the can from the original weight or sloshing the contents around within the can, one can very roughly estimate what percentage remains to be dispensed. However, this is at best inaccurate and often deceiving, as, very often, the entire liquid contents are not recoverable from a given container. Where the product itself is foamed, or of more volatile nature, or of minimum weight or of a nature which does not flow easily, even this rough estimate is impossible.

Due to the nature of the pressurized contents and the valves used to dispense same, it, of course, is not possible to estimate the quantity of contents during the dispensing operation. Likewise, due to the necessity of maintaining a seal in the can and maintaining the integrity of the can under a long shelf life and considerable pressure, it is not possible to provide visual access to the interior of the can, even if such were desirable.

An object of the invention is to provide means associated with a pressurized dispensing container that automatically indicates the relative level of pressure within the container and, thereby, the quantity of product remaining to be dispensed.

Another object of the invention is to provide pressure level and content level indicating means associated with pressurized dispensing containers, which indicating means are pressure actuated.

Another object of the invention is to provide such pressure and content level indicating means for pressurized dispensing containers which are simple, compact, reliable, attractive, easily interpreted, cheap and easy to apply.

Another object of the invention is to provide such pressure and content level indicating means which are safe, reliable and which do not in themselves represent a threat to the integrity of the container or the contents therein.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 5 is a partial, partly sectional view of a pressurized dispensing can having a different internal structure than the can of FIG. 1 and utilizing a different arrangement for indicating pressure therewithin.

FIG. 6 is a view taken along the line 6—6 of FIG. 5 in the direction of the arrows.

FIG. 7 is a view from below of the can of FIG. 5.

FIG. 8 is a side fragmentary view of the lower portion of a can utilizing a modified form of pressure indicating device, the view sectional in the lower right-hand corner.

FIG. 9 is a fragmentary, partially sectional view of the lower portion of a pressurized dispensing can showing yet another modified form of pressure indicating device.

Figure 1:
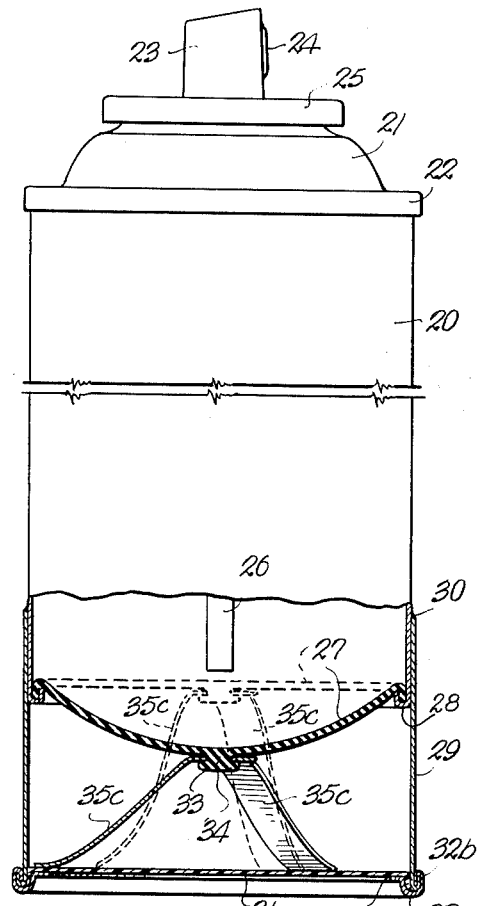
FIG. 1 is a side, partly sectional view of a pressurized dispensing container having a first form of the subject pressure indicating means associated therewith.

Referring to the drawings and particularly to FIG. 1, at 20 is indicated the side wall of a conventional or typical pressurized dispenser can or container, typically cylindrical in form or circular in horizontal section having a sealed cap 21 fixed to the top thereof by gripping shoulder connection 22. Any conventional type of dispensing valve 23 having outlet 24 is sealingly fixed to top 21 by means of ring flange 25. Depression of valve 23 by thumb pressure operates to open the valve and permit the pressurized contents of the container to come forth from outlet 24. A product drain tube 26 may typically communicate with valve 23 from the lower portion of the container.

All of the previously described structure is entirely conventional and is not shown internally or detailed because of such conventionality. It should be understood that any conventional aerosol or pressurized dispenser can construction with respect to the side wall, top, dispensing valve, product drain pipe, etc. may be employed without limitation and the instant improvement is not limited with respect to any given structure.

Referring now to a first form of the instant improvement, a resilient diaphragm 27 of rubber, reinforced rubber, resilient plastic, synthetic rubber or other suitable resilient material is sealingly circumferentially engaged or connected at its periphery to the lower end of side wall 20 as at 28, the connection here shown as an inward crimp of wall 28 whereby to engage the outmost periphery of the circular sheet or disc 27 of resilient material. It should be understood that any suitable peripheral connection which is fluid tight and which can withstand the pressures to be employed within the interior of wall 20 may be employed, including welding, fusing, cementing or other metal-resilient material engagement than that shown. Diaphragm 27 must be of sufficient strength and integrity to withstand over anticipated shelf life and use life intervals, the pressures to be employed within the can wall 20. Additionally, the upper surface thereof must be so treated or of such material as to not be dissolved or chemically reactive with the contents of the can or the carrier medium for pressurization within the can. Under certain circumstances, the upper surface, then, of diaphragm 27 may be plastic or other material coated for inertness and preservation of the material of the diaphragm itself, as well as the integrity of the product.

Surrounding the lower end of can wall 20 is the side wall 29 of a false bottom. Wall 29 is rigidly and sealingly connected to can side wall 20 as by a weld 30. Wall 29 need not withstand, ordinarily, the internal pressures of wall 20 and thus may be of lighter material. Alternatively, if it is desired that wall 29 serve as a safety retaining wall in conjunction and cooperation with the diaphragm member described, then same may be of equal thickness and strength as wall 20. Bottom wall 31, of transparent material such as a clear plastic, for example, methyl methacrylate or polystyrene, extends to cover the entire area of the lower opening of side wall 29 and is engaged therewith. Such engagement may be by means of a metallic circumferential retaining member 32 which here, with the outer portion 32b thereof, is crimped over the edge of wall 31 and into engagement with the lower end of wall 29. The inner portion of member 32 compacts lower wall 31 against the inner surface of wall 29 in said crimped engagement. A small inward extension of member 32 preferably underlies a portion of wall 31 prior to its contact with wall 29 for a purpose to be described.

Figure 3:
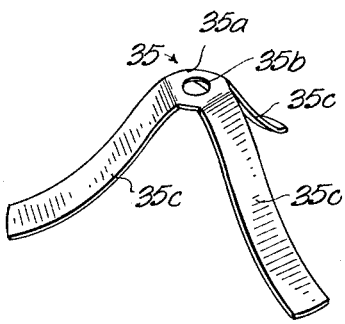
FIG. 3 is a perspective view from above of the pressure indicating spider of FIGS. 1 and 2, respectively.

Diaphragm 27 has, on the lower under surface thereof, button 33, here shown molded integral with diaphragm 27 and connecting thereto by material bridge or stem 34. Spider type engaging means (FIG. 3) generally designated 35 has central engaging portion 35a with opening 35b centrally thereof to permit engagement with button 33 and tripod legs 35c extending outwardly from said portion 35a and slightly flattened in the outermost portions thereof. Other conventional connections between spider and diaphragm may be used. Legs 35c are resiliently biased toward center 35a and are of such length as to be able to overlie in the outermost extensions thereof the inwardly extending flange 32a of member 32 on the underside of transparent wall 31 when diaphragm 27 is downwardly bulged by full pressurization in the can. Wall 31 also carries concentric rings of color as at 31a (typically green), 31b (typically orange) and 31c (typically red).

Attention is now drawn to the full line position of diaphragm 27 and spider 35, as well as the dotted line positions thereof in FIG. 1. The full line position represents the maximum content load of product to be dispensed inside the can walls 20 and 21. In full line position, spider legs 35c have the ends thereof out of sight through bottom 31 over portion 32a. Legs 35c also preferably abut substantially against wall 29. The tension in legs 35c tends to return them to a center position. As the pressure (and quantity of product contents remaining) within wall 20 drops, diaphragm 27 moves upwardly toward the dotted line position of FIG. 1, the latter representing a substantially empty or pressure-free state within the container. The inward extension of portion 32a from wall 29 is preferably equal to substantially the distance from the inward edge of portion 32a to the first line of color and, also, the distance between adjacent lines of color. Thus, by the time the ends of legs 35c first appear between portion 32a and color line 31a, approximately one-fourth of the contents of the vessel would have been dispensed or the pressure level would drop one-quarter. The progression to where the leg ends would lie on line 31a would then represent the next quarter loss of dispensable content and pressure, from 31a to 31b the third quarter loss of pressure and the final movement from line 31b to line 31c the final quarter of content and pressure remaining in the can. Thus the user is apprised, first while looking at the can on the shelves of the merchandiser, of the initial level of pressure and thereafter, as use begins and continues at the user's home, place of business, on the job site, etc. of the further remaining pressure in the can whereby he is warned when to purchase another can.

Directions for reading and interpreting the level indicator system in this form and others of the instant disclosure, including a color chart showing red is empty, green full, etc. may be provided on the side wall of the can or on any container for the can, or both.

Figure 4:
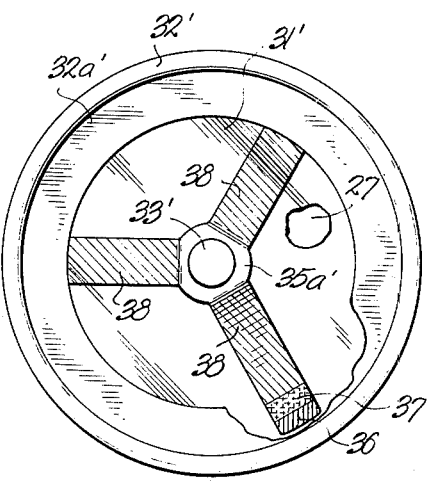
FIG. 4 is a view from the bottom of a can analogous to the view of FIG. 2 showing a modified arrangement for indicating pressure therein.
Figure 2:
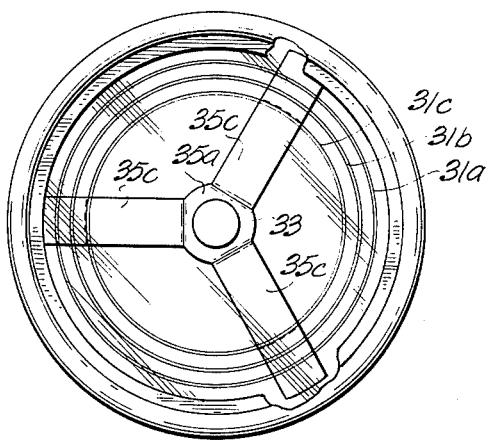
FIG. 2 is a view of the bottom of the can of FIG. 1.

Turning to FIG. 4, therein is shown a modified form of the subject invention wherein all parts are identical (and therefore numbered the same, but primed) except for changes in the outer member 32 (here 32'), the bottom 31 (here 31') and the underside of legs 35c (here 35c') of spider member 35. The change in member 32 lies in the greater inward extension of the portion 32a' whereby a greater inward portion of the transparent bottom 31' is obscured peripherally. The change in the transparent bottom 31' lies in the removal of color rings 31a, 31b and 31c with the transparent bottom remaining plain and without such indication. The change in the undersides of legs 35c lie in the provision of color zones thereon on one or more legs, here shown on all. As shown, the outermost zone 36 of each leg 35c' is colored, say, red, the next inward zone 37 colored, say, orange, while the entire innermost zone 38 of each leg 35c' is colored green up to center zone 35a'. Legs 35c' of FIG. 4 are shown in the substantially full outward extension position (equivalent to the full line showing of FIG. 1). In this particular case, exhaustion of approximately one-third of the pressurization and dispensable content of the can, the first third, results in the user seeing only green within the window bottom 31'. The usage of the second third of pressurization and content brings into view zone 37, the orange-colored zone, while in the last third of pressurization, the user sees the presence of red zone 36 appearing inwardly past the inward extension of screen portion 32a'. Thus the indicator means of FIGS. 1 and 2, as contrasted to the means of FIG. 4, consists in the indicating markers residing on transparent bottom 31 in the first form, while the indicating markers reside on the spider legs in the second form.

Referring to FIGS. 5–7, inclusive, therein is shown a third form of the subject indicating means for a pressurized dispenser container. It is quite common for such a pressurized dispenser container to employ, in or as the bottom wall thereof, a conical or semi-conical, arcuate upwardly formed barrier for better pressure resistant effects. The apparatus of FIG. 6 shows the use of the subject diaphragm indicator means in association with a conical or semi-conical upwardly formed bottom wall. The upper portion of the container and the valve dispensing means therefor, etc. will not be redescribed as, again, same are entirely conventional.

Side wall 40 has hollow, centered upwardly arcuate bottom 41 circumferentially sealingly affixed thereto as by weld 42. A resilient diaphragm 43 is sealingly connected to the periphery of an opening 44 present centrally of cone 41, such connection here shown employing an overlapping crimp as at 45. The material and strength of diaphragm 43 is the same as previously described with respect to diaphragm 27 of FIGS. 1 and 2 and the surface thereof exposed to the interior of the dispensing can should be protected against chemical reaction with the vessel contents or any weakening thereby. Connecting means, here again a button 46, may be formed integral with or otherwise connected to diaphragm 43 as by resilient material stem or bridge 47. A spider indicator means generally designated 48 (FIG. 6) has central portion 48a with central opening therethrough operative to receive button 46, downwardly inclined inward leg portions 48b and flat or horizontal (when the container is vertical) outer leg portions 48c, the latter lying substantially flat on bottom wall 49. The outermost portions of spider leg portions 48c have color zones thereon, here designated 50, 51 and 52, typically, red 50, orange 51 and green 52.

Bottom wall 49 is engaged with container side wall 40 by any suitable connection, here a crimp engagement involving a peripheral engaging ring member 53 having outer portion 53a crimping over the outermost portion of lower wall 49 and an inner portion 53b underlying the peripheral portion of wall 49 which is inward of side wall 40. Lower wall 49 is preferably shrouded centrally (opaqued) as at 49a and peripherally as at 49b thereby to leave an intermediate transparent ring zone 49c through which may be seen the color zones 50–52, inclusive, as the pressure level shifts in the can. The ring radial width preferably substantially equals the color zone widths. As desired, transparent bottom 49 may be transparent or opaque, in its outermost portion 49d inward of innermost portion 53b of member 53. Color zones 50–52, inclusive, are preferably so positioned, as in the transparent intermediate zone 49c of bottom 49, whereby, when diaphragm 43 is in the full line position of FIG. 5, color zone 52 is displayed in window portion 49c. Also in the full line position, downwardly angled leg portions 48b are resiliently centrally biased whereby to tend to return to a more vertical position as diaphragm 43 moves up to the dotted line position in FIG. 5. As such return is made, zones 51 and 50, successively, appear in window 49c whereby to demonstrate the lessening degree of pressure and quantity of contents remaining in the can. Each color zone represents a one-third quantity of pressure and dispensable context.

Referring to FIG. 8, therein is shown a fourth form of the subject indicating means wherein, in a dispensing can arrangement of conventional type, there is shown side wall 55 to the lower end of which is circumferentially and sealingly connected resilient diaphragm 56 by suitable means such as crimp engagement 57. The character of diaphragm 56 is that of those previously described, as at 43 and 27, namely, of sufficient strength and resilience to retain therewithin the pressurized contents of the vessel for as long a shelf and use life as desired while yet not affecting or being affected by the contents of the vessel of the pressure vehicle thereof. Diaphragm 56 is displaced downwardly in an arcuate curve by the pressure within can wall 55, the position shown being the extreme one under full pressurization with full dispensable contents within the can. False bottom 48 is provided having side wall 58a of transparent character sealingly circumferentially connected in any suitable manner as at 58b to the lower end of wall 55. Side wall 58a is of transparent material (methyl methacrylate, polystyrene, etc.) whereby the outline or position of diaphragm 56 may be closely seen therethrough. Color zones (also transparent or translucent) 59 (typically green), 60 (typically yellow) and 61 (typically red) may be provided in wall 58a. Alternatively, color lines 59a, 60a and 61a may be provided on either surface of wall 58a of like colors. The lower surface 58c of false bottom 58 may be transparent, if desired, but is preferably shrouded or opaque. In operation, as the pressure and content levels drop in the container and on the inner side of diaphragm 56, resilient diaphragm 56 retreats gradually upwardly through color zones 59, 60 and 61 (and past lines 59a, 60a and 61a) whereby, as it passes into and through the red zone 61 or past line 61a, the almost total loss of pressurization in the can is indicated, whereby the operator is warned to purchase another product-containing can.

FIG. 9 shows a fifth form of the subject pressure indicating means with all parts being precisely the same as in FIG. 8 (and therefore like parts numbered the same, but primed) save for additions to the underside of the diaphragm. These additions comprise connecting means as button 62 of resilient material (most easily formed integral with diaphragm 56') and here connected thereto by resilient material stem or bridge 63. Additionally, engaged with button 62 and stem 63 is a spoked disc or wheel having a continuous circumferential rim 64 connected by spokes 65 to circular, disc-like center portion 66. The latter has opening 67 therethrough whereby to be engaged with button 62 and stem 63. The purpose of the provision of the wheel attached to the underside of diaphragm 56 is to provide a more easily visible side indicator adjacent color zones 59', 60' and 61' (or lines 59a, etc.). Thus, as diaphragm 56' rises upwardly with the decrease of pressure and dispensable content in the container, peripheral rim portion 64 of the wheel rises upwardly through and next the color zones (and lines) thereby giving an accurate and precise indication of the pressure, etc. level in the can. It should be noted that the provision of spokes 65 with spaces therebetween prevents any capture of air above the wheel should it be provided that rim 64 circumferentially abuts against the inside surface of wall 58a'.

Bleed pores, openings, ports or passages may be provided in the false bottom structures below the diaphragms of any of the above forms to permit atmospheric pressure evaluation within the false bottoms as the diaphragm positions vary in can filling and emptying. Such openings may be in side or lower walls.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a pressurized dispensing container having a volume enclosing side wall and at least a partial bottom closure, the combination of a resilient diaphragm sealed peripherally with respect to said bottom closure having one side thereof exposed to the pressures of the interior of the container and the other side thereof exposed to atmospheric pressure external of said container, said bottom closure comprising an essentially frusto-conical flange in transverse cross section peripherally secured to said side wall and having said diaphragm affixed centrally thereof, and means associated with said container and cooperating with said diaphragm operative to indicate the relative level of pressure interiorly of the can according to deformation of the diaphragm by said pressures.

2. In a pressurized dispensing container having a volume enclosing side wall, the combination of a resilient diaphragm sealed peripherally with respect to said side wall having one side thereof exposed to the pressures of the interior of the container and the other side thereof exposed to atmospheric pressure externally of the container, said diaphragm adapted to distend below the level of peripheral connection thereof to said side wall to a degree at least substantially proportional to the level of pressure within the container and bottom closure means for said container enclosing said diaphragm and having a side wall portion thereof sufficiently transparent whereby the relative position of the diaphragm with respect to same can be ascertained.

3. The combination as in claim 2 including indicating means connected to said diaphragm and extending adjacent the transparent portion of said bottom closure to aid in discerning the relative position of the diaphragm with respect to same.

4. In a pressurized dispensing container having a vollume enclosing side wall, the combination of a resilient diaphragm sealed peripherally with respect to said side wall having one side thereof exposed to the pressures of the interior of the container and the other side thereof exposed to the atmospheric pressure external of said container, a false bottom structure enclosing the lower end of said container including the outer surface of said diaphragm, and indicator means coupled with the outside surface of said diaphragm and cooperating with a portion of said false bottom whereby to indicate the relative pressure level within the container.

5. The combination as in claim 4 including a scale on one of the indicator means and a portion of said false bottom adapted to aid in indicating the relative pressure level in the container.

6. The combination as in claim 4 wherein said indicator means includes a spider construction coupled centrally to said diaphragm and moving with respect to a portion of said false bottom to indicate said relative level of pressure within the container.

7. In a pressurized dispensing container having a volume enclosing wall, the combination of a resilient diaphragm spanning an opening in said wall and sealed peripherally with respect to said wall opening, said diaphragm having one side thereof exposed to the pressures of the interior of the container and the other side thereof exposed to atmospheric pressure external of the container, and means associated with said container wall and cooperating with said diaphragm operative to indicate the relative level of pressure within the container according to deformation of the diaphragm by pressures therewithin.

8. The combination as in claim 7 wherein the indicating means includes an at least partly transparent housing enclosing the container wall portion including said opening.

9. The combination as in claim 8 including means connected to said diaphragm operative to move with respect to said transparent housing portion whereby to indicate said pressure level.

References Cited by the Examiner
UNITED STATES PATENTS

| | | | |
|---|---|---|---|
| 876,968 | 1/08 | James | 222—392 |
| 2,002,883 | 5/35 | Deming. | |

LOUIS J. DEMBO, *Primary Examiner*.